United States Patent [19]

Kordesch

[11] 4,011,103
[45] Mar. 8, 1977

[54] CATHODE CONTACT MEMBER FOR ALKALINE ROUND CELLS

[75] Inventor: Karl Victor Kordesch, Lakewood, Ohio

[73] Assignee: Union Carbide Corporation, New York, N.Y.

[22] Filed: Mar. 29, 1976

[21] Appl. No.: 671,671

[52] U.S. Cl. .............................. 429/66; 429/241; 429/242
[51] Int. Cl.² ...................................... H01M 21/06
[58] Field of Search ......... 136/13, 14, 83 R, 100 R, 136/107, 135 R

[56] References Cited

UNITED STATES PATENTS

| | | | |
|---|---|---|---|
| 2,962,540 | 11/1960 | Kordesch | 136/123 |
| 3,087,003 | 4/1963 | Drengler et al. | 136/10 |
| 3,170,820 | 2/1965 | Drengler et al. | 136/10 |
| 3,219,487 | 11/1965 | Krouse et al. | 136/107 |

*Primary Examiner*—Anthony Skapars
*Attorney, Agent, or Firm*—Eugene Lieberstein

[57] ABSTRACT

A cathode contact member is disposed at the interface between the molded tubular cathode shell and the interior side walls of the metallic container in an alkaline round cell, the contact member being at least partially embedded in the tubular cathode shell and making permanent electrical connection with the metallic container.

17 Claims, 5 Drawing Figures

CATHODE CONTACT MEMBER FOR ALKALINE ROUND CELLS

The present invention relates to alkaline dry cells in general, and more particularly to the provision of an improved cathode contact member in alkaline round cells.

Various proposals have been made for improving the discharge characteristics of conventional alkaline dry cells. These proposals have been directed mainly toward the provision of improved cathode members for such cells. Conventionally, these cathods have been made by molding a mixture of oxidic depolarizer particles, chemically non-reactive, electrically conductive particles, and electrolyte. Suitable binder materials have been employed in the cathode mixture in order to cohesively bond the mix particles together and to achieve good electronic particle-to-particle contact throughout the body of the cathode.

Thus, in U.S. Pat. No. 2,962,540 K. Kordesch, a cathode member is disclosed in which the oxidic depolarizer particles and non-reactive electrically conductive particles are bound together through the use of an inorganic cement binder such as Portland cement. Cathodes using this inorganic cement binder are particularly useful in primary alkaline cells.

U.S. Pat. No. 3,113,050 also to K. Kordesch discloses another cathode member in which the mix particles are bound together through the use of a latex binder, in addition to the inorganic cement binder. This type of cathode member is particularly useful in rechargeable cells where there is a tendency for the active cathode material to expand on cell discharge and conversely to contract when the cell is charged.

It has also been proposed to employ so-called "plastic bonded" cathode members in alkaline dry cells. Such cathode members may be made, for example, from a mixture of oxidic depolarizer particles and non-reactive electrically conductive particles, both of which are substantially uniformly dispersed in a conductive polymeric binder comprising colloidal conductive material and an electrolyte wettable polymeric binder such as an epoxy resin. Plastic bonded cathods of this type are disclosed in the pending U.S. application Ser. No. 437,695 of K. Kordesch et al., now U.S. Pat. No. 3,945,847, filed Jan. 29, 1974.

Many alkaline round cells conventionally employ a cathode member which consists of a molded tubular cathode shell. The cathode shell is molded by extruding the cathode mixture directly against the interior side walls of the metallic can, e.g., steel can, which serves as the cell container. The molding operation is carried out in such a way that the tubular cathode shell makes good physical and electronic contact with the side walls of the metallic can which also serves as the cathode collector. If good interfacial contact is not achieved between the cathode shell and the metallic can during the molding process or is lost during storage or use of the cell, then the useful life of the cell can be seriously shortened. Moreover, it is essential to maintain uniform interfacial contact if most efficient utilization of the active cathode material is to be realized.

The problem that has been heretofore encountered, however, is that interfacial contact between the tubular cathode shell and the metallic can may frequently be lost due to shrinkage of the cathode member after the cells have been assembled. For instance, cement-bonded cathodes tend to undergo shrinkage on drying after the cathode molding process. This is particularly aggravated by storage of the cells at elevated temperatures. Also, plastic-bonded cathodes tend to shrink away from the metallic can after the solvent that is used for the binder has evaporated. When shrinkage of the cathode shell occurs, contact with the interior walls of the metallic can may either substantially or partially lost. If substantially lost, then the cells are rendered useless. Where only partial loss of contact occurs, certain detrimental effects may still take place. For instance, shrinkage of the cathodes after molding may result in void spaces being left between the cathode and the can which can at some point in cell life fill with electrolyte. The presence of electrolyte in these void spaces promotes a high resistance film between the cathode shell and the metallic can. This film can seriously limit the high rate discharge performance of the cell (also the high rate charge acceptance in the instance of rechargeable cells).

In U.S. Pat. No. 3,738,869 to Zaleski, there is disclosed an alkaline round cell construction wherein the conventional molded tubular cathode shell is replaced by a cathode member which is designed to overcome the abovementioned difficulties. The cathode member consists of a stack of annular hollow cylindrical depolarizer pellets having metallic annular contact ring discs disposed between adjacent pellets, the metallic ring discs being snugly fitted inside the metallic can so as to make good physical and electronic contact with the interior side wall of the can. The metallic ring discs are not subject to deterioration and they do not undergo expansion and contraction during charge-discharge cycling in rechargeable cells. However, the problem with cathode members of this type is that they are considerably more difficult and time-consuming to assemble as compared to the conventional molded tubular cathode shell and are, of course, more expensive to manufacture.

The present invention resides in an improved alkaline round cell construction which also overcomes the abovementioned difficulties but which is simple in construction and more practical and economical to manufacture. More specifically, the present invention provides an improved alkaline round cell construction which uses a molded tubular cathode shell wherein provision is made to accommodate possible shrinkage of the cathode shell thereby preventing loss of contact between the cathode shell and the metallic can.

In accordance with the present invention, a cathode contact member is positioned at the interface between the molded tubular cathode shell and the interior side walls of the metallic can, the cathode contact member making permanent contact with the metallic can and being at least partially embedded in the cathode shell. In this manner, permanent electronic connection with the cathode shell is always maintained even though shrinkage of the cathode shell may occur after molding which might otherwise result in loss of contact with the metallic can, rendering the alkaline cell useless.

Elimination of the problem of cathode shrinkage, i.e., loss of contact with the metallic can without the need to reconstruct the cathode member is particularly advantageous since the most practical and economic way to assemble the cell is to extrude the tubular cathode shell inside the metallic can. Furthermore, the use of the molded tubular cathode shell together with the cathode contact member of the present invention does not involve extensive and costly modification of present cell manufacturing methods and equipment.

During cathode molding, the cathode contact member of the present invention is first placed inside the metallic can adjacent to its interior side walls and permanent electronic connection with the metallic can is then established. Next, the tubular cathode shell is extruded inside the metallic can using the same manufacturing techniques and equipment as heretofore employed in the assembly of prior cells. In this instance, however, the cathode shell is also extruded in contact with the cathode contact member such that the latter is at least partially embedded in the finished cathode shell. Should any shrinkage of the cathode shell occur, permanent contact with the metallic can is still maintained by the provision of the cathode contact member in a permanent position throughout the useful life of the cell.

A further significant feature of the present invention resides in the fact that the arrangement of the cathode contact member is such that the contact member makes substantially uniform contact with the whole body of the cathode shell. In this manner, most efficient utilization of the active cathode material during cell discharge can be readily attained.

The cathode contact member of the present invention may be made from an electrically conductive material such as metal. It should also be made of a material which is resistant to corrosion in the cell environment and which is compatible with the cell environment. Steel is an excellent choice for the cathode contact member.

The cathode contact member of the present invention may be a solid or foraminous structure. In a preferred embodiment of the present invention, the cathode contact member is made from an open metal mesh or metal screen which is formed into a cylinder having an external diameter approximately the same or slightly less than the internal diameter of the metallic can.

During cathode molding, the mesh or screen cylinder is first placed inside the metallic can and is secured in electrical connection therewith, for example, by means of spot welding or simply by providing a tight force-fit. The tubular cathode shell is then formed by extruding the cathode mixture over and through the interstices of the mesh or screen cylinder so that the latter is at least partially embedded in the body of the formed cathode shell.

In other embodiments of the present invention, the cathode contact member may be made from a pleated, scalloped, waved or undulated metal mesh or screen. The contact member may also be composed of a plurality of solid metal vanes held in place by a retainer ring or a solid metal body having shaped protuberances partially punched out and bent inward.

The principal object of the present invention is to provide an alkaline dry cell having improved discharge performance.

Another object of the present invention is to provide an alkaline dry cell having improved electrochemical utilization of the active cathode material.

Still another object of the present invention is to provide an alkaline round cell of either the primary or rechargeable type which employs a molded tubular cathode shell wherein good physical and electronic interfacial contact can be maintained between the cathode shell and the metallic can.

A further object of the present invention is to provide both primary and rechargeable alkaline round cells of the type described which are simple in construction, relatively easy to assemble and which are inexpensive to manufacture.

The present invention will now be more particularly described in connection with certain preferred embodiments thereof which are illustrated in the accompanying drawing wherein.

Figure 1:
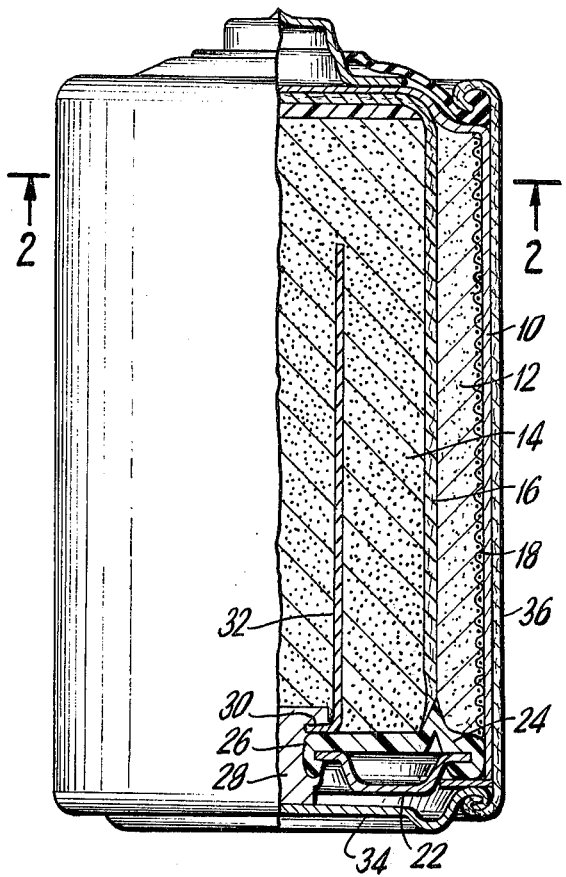
FIG. 1 is an elevational view in partial section of an alkaline round cell construction embodying the present invention.

Referring now to the drawing in detail wherein like numerals denote the same or similar parts, there is shown in FIG. 1 an alkaline round cell construction embodying the present invention. The cell includes a metallic can 10 having that end which is open during cell assembly subsequently both liquid-and gas-tightly sealed by a seal closure which shall be hereinafter described in detail. The metallic can 10 includes therein a molded tubular cathode shell 12 disposed against the interior side walls of the metallic can 10 and an anode element 14 disposed in the central cavity inside the tubular cathode shell 12. The anode element 14 is separated from the cathode shell 12 by a porous, ionically permeable separator 16. Suitably, the anode element 14 may be composed of finely-divided active metal particles, e.g., zinc, suspended in an electrolyte gel such as carboxymethylcellulose. The electrolyte may be an aqueous alkaline electrolyte solution such as a 35% by weight solution of KOH.

Figure 2:
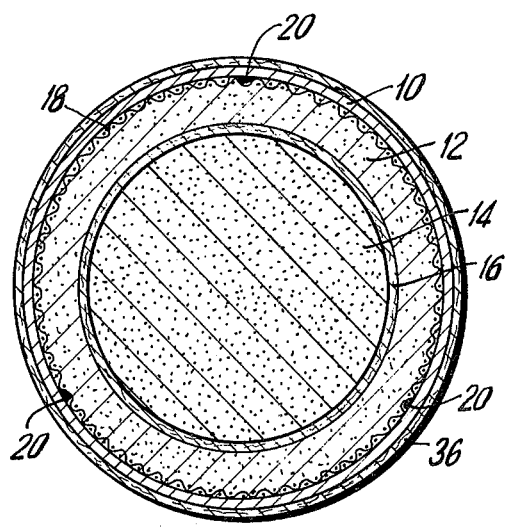
FIG. 2 is a cross-sectional view taken along the lines 2—2 in FIG. 1.

The tubular cathode shell 12 may be a conventional cement-bonded cathode which is molded from a mixture containing oxidic depolarizer particles such as manganese dioxide particles and non-reactive, electrically conductive particles such as finely-divided carbon or graphite and an inorganic cement binder such as Portland cement. The cathode shell 12 is molded by extruding the cathode mixture directly against the interior side walls of the metallic can 10 using known extrusion methods and techniques. In this instance, however, a cathode contact member is first positioned adjacent to the side walls of the metallic can 10 prior to molding the cathode shell 12. The contact member is made from a metal mesh or screen, e.g., steel, which is formed into a cylinder 18 having an outside diameter the same or slightly less than the inside diameter of the metallic can 10. The cylinder 18 fits snugly inside the metallic can 10 and is secured thereto, for example, by means of one or more spot welds 20 (see FIG. 2). In extruding the cathode shell 12, the cathode mixture is forced over and through the openings in the metal mesh or screen cylinder 18 in such manner that the cylinder is partially or even substantially embedded within the body of the formed cathode shell 12. Thus, it will be seen that with the provision of the cathode contact member at the interface between the cathode shell 12 and the metallic can 10, should any shrinkage of the cathode shell 12 occur after cell assembly, the contact member will still maintain permanent physical and electronic contact with the cathode shell even though the latter may lose contact itself with the metallic can 10.

The seal closure for the cell may be of the type disclosed and claimed in U.S. Pat. No. 3,042,734, issued to J. L. S. Daley et al, on July 31, 1962. Such a closure comprises a rigid metallic plate 22 which is both liquid- and gas-tightly sealed within the open end of the metallic can 10 by means of a nylon gasket 24 having a central opening 26. This opening is of a diameter slightly smaller than the external diameter of a metallic rivet 28. The rivet 28 is driven through the opening 26 whereupon the gasket 24 is radially compressed between the metallic plate 22 and the rivet head. Prior to driving rivet 28 through the gasket 24, the rivet is passed through a central opening in a metallic anode collector 30. This anode collector 30 may be formed by a pair of rod-like members 32 (only one of which is shown in FIG. 1) which extend into contact with the anode element 14. A metallic cover plate 34 is then positioned over the sealed end of the cell in electrical connection with the rivet 28 and has its outer peripheral edges locked in engagement with a non-corrodible (paper) cell jacket 36.

Figure 3:
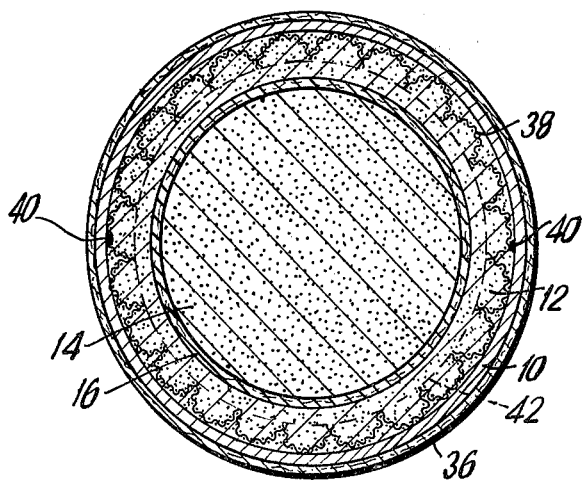
FIG. 3 is a cross-sectional view similar to FIG. 2 showing another embodiment of the present invention.

FIG. 3 shows a different embodiment of the present invention wherein the cell construction is basically the same as that described above except that the cathode contact member is composed of a cylinder 38 made from a pleated metal mesh or screen, e.g., steel. The pleats may be made by folding the metal mesh or screen in accordion style prior to forming the cylinder 38. As in the previous embodiment, the pleated mesh or screen cylinder 38 has an outside diameter which is the same or slightly less than the inside diameter of the metallic can 10. The cylinder 34 fits snugly inside the metallic can 10 and may be permanently secured to its side walls by means of spot welds 40. Preferably in this embodiment, however, the cylinder 38 is mounted onto a metal ring 42, e.g., steel, which is located at the one end of the metallic can 10 (i.e., that end which is the bottom during cell assembly) as shown by the dotted lines in FIG. 3. The ring 42 may be secured to the metallic can 10 such as by means of spot welds (not shown). Further in this embodiment, the ring 42 serves to hold the pleated mesh or screen cylinder 38 together and to facilitate its insertion into the metallic can 10 during cell assembly. The cathode shell 12 is of course formed in basically the same manner as described above by extruding the cathode mixture over and through the openings in mesh or screen cylinder 38 and directly against the interior side walls of the metallic can 10. Alternatively, the cathode shell may be formed outside of the can by extruding the cathode mixture onto and into the inner walls of the mesh or screen cylinder and subsequently force-fitting the cathode shell and contact member inside the can.

Figure 4:
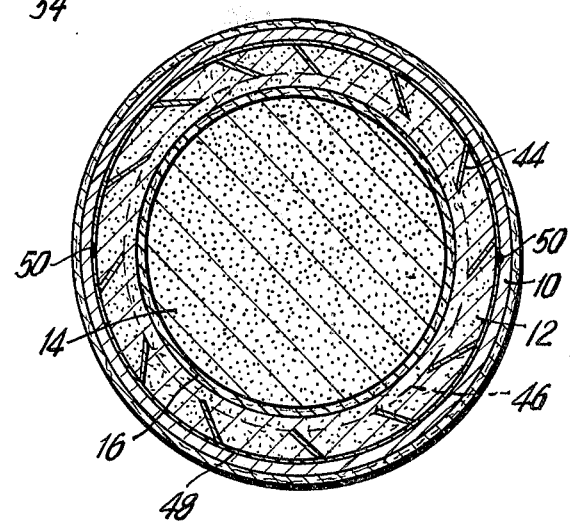
FIG. 4 is a cross-sectional view also similar to FIG. 2 showing still another embodiment of the present invention.

In FIG. 4 there is shown still another embodiment of the present invention wherein the cathode contact member is composed of a multiplicity of spaced-apart solid metal vanes 44, e.g., steel, mounted onto a metal ring 46, as also shown by dotted lines in FIG. 4, in one end of the metallic can 10 (i.e. that end which is the bottom during cell assembly). The metal vanes 44 are arranged in louvered fashion around the circumference of the metal ring 46 which may also be secured to the can 10 by spot welds (not shown). Alternatively, the metal vanes 44 may be secured at the other ends thereof to another metal ring located near that end of the can 10 which is open during cell assembly. The vanes 44 may be alternatively secured to a metal sleeve 48 which snugly fits inside the metallic can 10 and which serves to support the vanes 44 particularly during cell assembly. The metal sleeve 48 may be composed of a solid metal or metal mesh or screen, e.g., steel. The metal sleeve may also have the vanes or other shaped protuberances partially punched therefrom and bent inward. Preferably these types of sleeves would also be secured to the interior side walls of the can 10 by spot welds 50. Again the cathode shell 12 is molded in basically the same manner by extruding the cathode mixture through the spaces between the louvered vanes 44 or other shaped protuberances and directly against the interior side wall of the metallic can 10.

Figure 5:
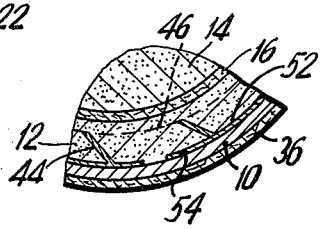
FIG. 5 is a fragmentary view of a portion of the cell in FIG. 4 showing still another embodiment of the present invention.

Alternatively, the cathode contact member may be composed of a split solid metal scroll-like member 52 having spring characteristics such as shown in FIG. 5. This member may suitably have one longitudinal edge at the split secured to the inner wall of the can, for example by spot welds 54, and the other longitudinal edge at the split left free to move in order to accommodate any expansion or contraction of the active cathode material. The resilient nature of this type of member would permit maintenance of contact with the cathode shell at all times.

It should be noted that in the embodiments shown in FIGS. 3-5, part of the cathode-contact member is deeply embedded in the body of the cathode shell 12. This assures that permanent contact with the cathode shell will be maintained even though substantial shrinkage of the cathode may occur after cathode molding. Additionally, the cathode contact member in these embodiments is ideally suited for use in those instances where the cathode shell has a relatively thick wall structure.

A significant feature of the present invention resides in the fact that the cathode contact member makes permanent physical contact substantially uniformly around at least the outermost circumference of the cathode shell. In this manner, current paths are substantially evenly distributed throughout the body of the cathode shell and accordingly the cathode material will be substantially completely utilized during discharge of the cell.

What is claimed is
1. An alkaline round cell comprising, in combination:
  a. a metallic cylindrical cell container;
  b. a molded tubular cathode shell disposed inside said metallic container, said tubular cathode shell comprising a mixture of finely-divided oxidic depolarizer particles, chemically non-reactive, electrically conductive particles and electrolyte; and
  c. a cathode contact member disposed at the interface between said cathode shell and the interior side walls of said metallic container, said cathode contact member being at least partially embedded in the outermost circumferential portions of said tubular cathode shell and making permanent electrical connection with said metallic container.

2. An alkaline round cell as defined by claim 1 wherein the cathode contact member is a metal mesh or screen cylinder snugly fitted inside said metallic container.

3. An alkaline round cell as defined by claim 2 wherein said metal mesh or screen cylinder is spot welded to said metallic container.

4. An alkaline round cell as defined by claim 2 wherein the cathode mixture is extruded over and through the openings in the metal mesh or screen cylinder directly against the interior side walls of said metallic container.

5. An alkaline round cell as defined by claim 1 wherein the cathode contact member is a pleated metal mesh or screen cylinder snugly fitted inside said metallic container.

6. An alkaline round cell as defined by claim 5 wherein said pleated metal mesh or screen cylinder is support on and connected to a metal ring located within one end of said metallic container.

7. An alkaline round cell as defined by claim 1 wherein the cathode contact member comprises a multiplicity of metal vanes arranged in louvered fashion and supported on and connected to a metal ring within one end of said metallic container.

8. An alkaline round cell as defined by claim 7 wherein said metal vanes are secured to a metal sleeve snugly fitted inside said metallic container.

9. An alkaline round cell as defined by claim 7 wherein the metal vanes are supported between and connected to a pair of metal rings.

10. An alkaline round cell as defined by claim 1 wherein the cathode contact member comprises a split metal scroll-like member having one longitudinal edge at the split which is free to move in order to accommodate expansion or contraction of the active cathode mixture.

11. An alkaline round cell as defined by claim 10 wherein said split metal scroll-like member is made from solid metal.

12. An alkaline round cell as defined by claim 10 wherein said split metal scroll-like member is made from metal mesh or screen.

13. An alkaline round cell as defined by claim 10 wherein the outer longitudinal edge of said metal scroll-like member is permanently secured to said metallic container.

14. An alkaline round cell as defined by claim 11 wherein said split metal scroll-like member has a multiplicity of protuberances which are partially punched therethrough and which extend into said tubular cathode shell.

15. An alkaline round cell as defined by claim 1 wherein said cathode contact member is a pleated, scalloped, waved or undulated metal mesh or screen.

16. An alkaline round cell as defined by claim 1 wherein said cathode contact member is a solid metal body having shaped protuberances partially punched therethrough and extending inwardly into said tubular cathode shell.

17. An alkaline round cell as defined by claim 1 wherein said cathode contact member is made of steel.

* * * * *

UNITED STATES PATENT OFFICE
CERTIFICATE OF CORRECTION

Patent No. 4,011,103      Dated March 8, 1977

Inventor(s) Karl V. Kordesch

It is certified that error appears in the above-identified patent and that said Letters Patent are hereby corrected as shown below:

Column 1, line 13 - change the word "cathods" to

---cathodes---

Column 1, line 44 - change the word "cathods" to

---cathodes---

Column 2, line 8 - insert the word ---be--- after the word "may"

Signed and Sealed this nineteenth Day of July 1977

[SEAL]

Attest:

RUTH C. MASON
*Attesting Officer*

C. MARSHALL DANN
*Commissioner of Patents and Trademarks*